United States Patent [19]

Hucknall

[11] Patent Number: 5,566,561
[45] Date of Patent: Oct. 22, 1996

[54] AUTOMOBILE ANTI-THEFT DEVICE

[76] Inventor: Richard Hucknall, 3 Fairview Ave., Great Neck, N.Y. 11023

[21] Appl. No.: 263,727

[22] Filed: Jun. 22, 1994

[51] Int. Cl.$^6$ ................................................. B60R 25/02
[52] U.S. Cl. ............................................. 70/209; 70/226
[58] Field of Search .............................. 70/18, 19, 209, 70/211, 212, 225, 226, 237, 238

[56] References Cited

U.S. PATENT DOCUMENTS

| | | | |
|---|---|---|---|
| 3,462,982 | 8/1969 | Moore | 70/209 |
| 4,738,127 | 4/1988 | Johnson | 70/209 |
| 4,974,433 | 12/1990 | Wang | 70/237 X |
| 5,007,259 | 4/1991 | Mellard | 70/209 |
| 5,014,529 | 5/1991 | Wu | 70/209 |
| 5,040,388 | 8/1991 | Chen | 70/209 |
| 5,138,853 | 8/1992 | Chen | 70/238 X |
| 5,142,889 | 9/1992 | Liu | 70/209 |
| 5,165,264 | 11/1992 | Chen | 70/209 |
| 5,267,458 | 12/1993 | Heh | 70/209 X |
| 5,297,406 | 3/1994 | Lin | 70/209 |
| 5,381,679 | 1/1995 | Cummins | 70/238 X |

FOREIGN PATENT DOCUMENTS

36163/89  12/1990  Australia ................................. 70/237

*Primary Examiner*—Lloyd A. Gall
*Attorney, Agent, or Firm*—Robert R. Strack

[57] ABSTRACT

An anti-theft device for attachment to the steering wheel of an automobile comprising two members having elongated shell housings adapted for coaxial coupling. The members enclose a core element that is controllably translated to rigidize the coupling, effect attachment to the steering wheel, and extend one end of the assembled device beyond the periphery of the steering wheel. The members are quickly disassembled for storage in the automobile glove box. When packaged for storage, the length of the package is less than one-half the length of the assembled device.

20 Claims, 5 Drawing Sheets

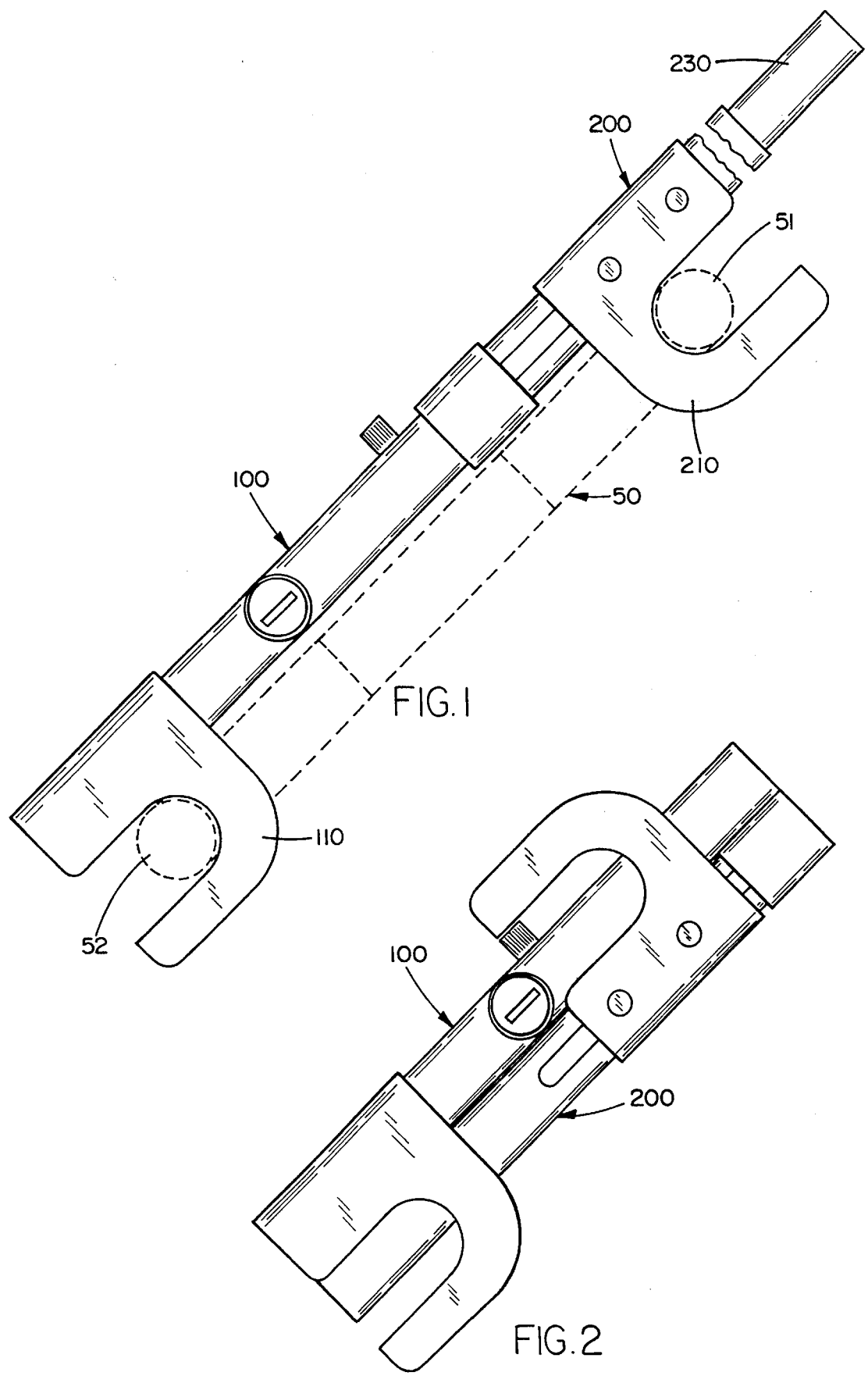

5,566,561

AUTOMOBILE ANTI-THEFT DEVICE

BACKGROUND OF THE INVENTION

1. Field of the Invention

The present invention relates to devices for preventing the theft of automobiles; more particularly, it relates to portable devices that may be selectively attached to the steering wheel of an automobile to prevent unauthorized use.

Automobile theft is a major concern of owners, law enforcement officials and insurance companies. Many thefts are perpetrated by "amateurs" who intend to use the vehicle for a short time and then abandon it. In these instances, the vehicle is often damaged during the initial forced entry and start-up. The problem of theft prevention for automobile owners includes not only, actual prevention of the theft, but the discouragement of potential thieves from electing the owner's car rather than other vehicles. This leads to the value of highly visible deterrent means.

Portable anti-theft devices are not "built-in" to automobiles. They must be supplied by the owner or user. Cost effectiveness, ease of application and storage are important characteristics of such devices. In many cases, an owner will choose not to use such devices because they are deemed unnecessary at the particular time, or under "the particular conditions. When not in use the devices should be stored out of sight and out of the way of both the driver and any passenger, yet within easy reach and accessibility.

Anti-theft devices that attach to the steering wheel satisfy a number of the features described. They can be affixed to the wheel only when desired. They are visible from outside the vehicle. They effectively disable the vehicle from operation, even if a potential thief enters the vehicle and starts its engine. However, because they function by projecting beyond the perimeter of the wheel they must be unduly long and rigid. These characteristics are in opposition to the desire for a device that can be stored during non-use.

The most common compartment in the passenger area of an automobile is the glove box. The disassembled device should be dimensioned for storage in such a glove box. Fractions of an inch in both length and width are important because effectiveness as a theft deterrent or storage capability is lost, if the devices are too short on the steering wheel, or too big for the glove box.

2. Description of Related Art

U.S. Pat. No. 4,738,127 to Johnson, describes a steering wheel locking device that is unsuitable for storage. This device, is designed to be engaged across a steering wheel and project past the circumference so that it prevents rotation and vehicle steering. The long, heavy device must be laid down on the floor of the vehicle when it is not in use. It blocks the passenger space of either adjacent or rear seat passengers and strains the muscles of the person placing it out of the way.

U.S. Pat. No. 5,014,529 to Wen-Yin Wu, U.S. Pat. No. 5,040,388 to Shih-Yu Chen, and U.S. Pat. No. 5,165,264 to Chiu-Lin Chen disclose multiple element devices that address the need to reduce the length of the locking member so that it can be stored. In doing so, they introduce: the need for ease of assemble and disassembly and the importance of interconnecting the elements so they cannot be disassembled by potential thieves. Also, the storage problem is not resolved if the disassembled device is not "packaged" and dimensioned for ease of handling and storage. These patents each fail to meet one or more of these criteria.

SUMMARY OF THE INVENTION

It is an object of the present invention to provide an improved automobile anti-theft device.

It is a further object of the present invention, to provide an improved portable automobile anti-theft device operative by attachment to the steering wheel to prevent unauthorized rotation.

Another object of the present invention is to provide an improved automobile anti-theft device for attachment to the steering wheel, which will not be subject to fracture or removal by prying.

Yet another object of the present invention is to provide an improved automobile anti-theft device for attachment to the steering wheel, that is designed for removal, disassembly, and storage within the glove box.

The invention features a two-member device that can be conveniently installed, or removed and stored while the driver is confined in the seat of an automobile by the steering wheel and the presence of an adjacent passenger.

Another feature of the invention lies in the provision of a two-member device that is assembled to extend to a length that is greater than the sum of the individual members.

A third feature of the invention permits an operator, by a single mounting action, to sequentially effect attachment of the device to the steering wheel and then extend it to a length that will prevent unauthorized rotation of the wheel.

In accordance with a particular embodiment of the invention, these objects and features are achieved with an anti-theft device for attachment to the steering wheel having two elongated shell housings adapted for coaxial coupling; the housings enclose a core that is controllably translated along the common axis to rigidize the coupling, effect mounting of the device, and extend one end of the assembled device beyond the periphery of the steering wheel.

These and other objects and features of the invention will be more fully understood and appreciated from the detailed description and claims, taken in conjunction with the drawings.

BRIEF DESCRIPTION OF THE DRAWINGS

FIG. 1 is a side view of an illustrative embodiment of the invention, assembled for mounting upon an automobile steering wheel;

FIG. 2 is a side view of an illustrative embodiment of the invention, disassembled and packed for storage;

DESCRIPTION OF THE PREFERRED EMBODIMENT

Figure 3:
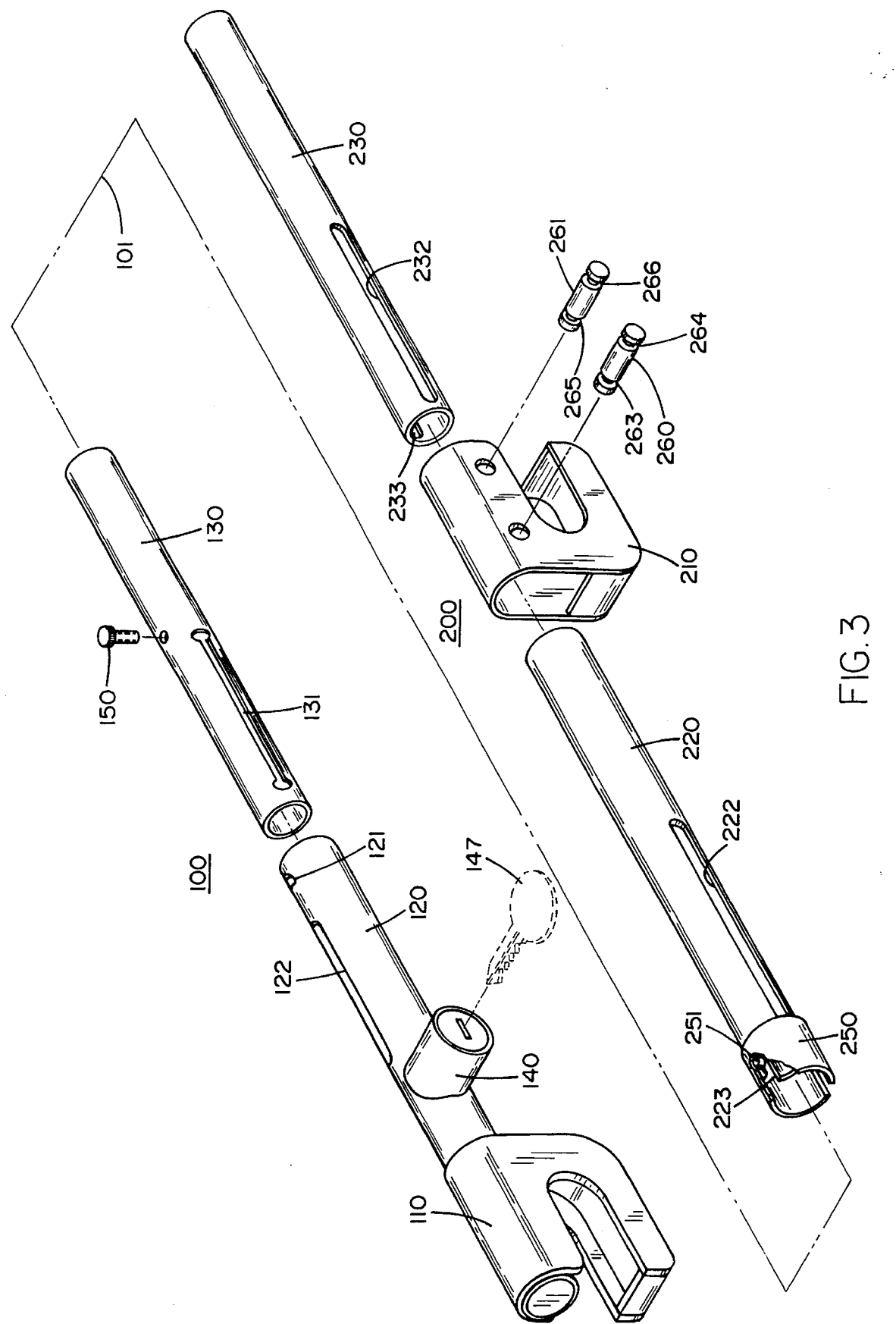
FIG. 3 is an exploded perspective view of an illustrative embodiment of the invention showing the general configuration and orientation of the various principle components.
Figure 6:
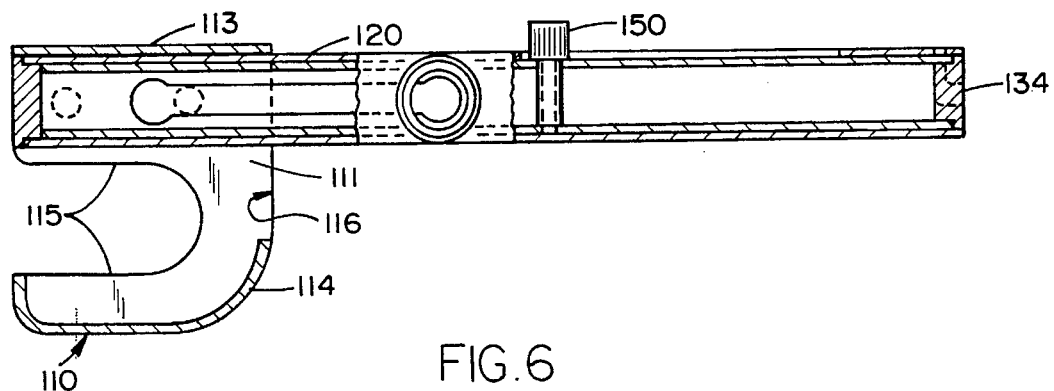
FIG. 6 is a cross-section of the control member taken generally along line 6—6 in FIG. 4B.

The following description of a preferred embodiment describes a number of specific structural features to illustrate the concepts and functioning of the means by which the invention may be practiced. It is intended that the invention should be restricted only to the extent defined by the appended claims.

FIG. 1 illustrates the anti-theft device of this invention, assembled for mounting on the steering wheel 50 of a protected automobile, the wheel being shown in phantom outline. The device comprises a control member 100 and an interconnected actuated member 200. These members have wheel gripping elements 110 and 210, respectively, which are locked apart and saddle opposed portions 51,52 of the wheel. Extension element 230 projects beyond the perimeter of the wheel and in known fashion prevents it from being used for steering while the device is in place.

FIG. 2 shows the compact "package" of the members 100,200 when they are disassembled and arranged for storage. As explained hereinafter, the length of this package is less than one-half the length of the assembled device. This is a critical necessity if one is to fit the package into a glove box while still providing an assembled length that is long enough to defeat the steering function of the automobile.

Before describing the important individual structural features of the invention, a general understanding of the embodiment, will be available upon consideration of the exploded view in FIG. 3. Control member 100 and actuated member 200 are adapted to be interconnected along a common axis 101. Each contains a telescoping core member 130, 230, respectively. They are coupled via a concealed pin 251 on actuated member 200, which projects radially inward and is engageable in a slot 121 at the end of the shell 120 of control member 100. This coupling is rigidized and made tamperproof by a case-hardened shroud 250, which is an integral part of actuated member 200.

The drive element 130 is telescopically mounted within the shell 120 of control member 100. It is retained and controlled by a locking arrangement 140 and translated to effect mounting of the device on a steering wheel by an actuator handle 150. When assembled and released by locking arrangement 140, under control of key 147, translation of handle 150 along the slot 122 in shell 120, causes drive element 130 to either contract within the shell or extend outwardly into the coaxially aligned shell 220 of actuated member 200.

Wheel gripper 210 is saddled over the outer shell 220 of actuated member 200 and extender element 230 is telescopically mounted within the shell 220. They are held in working relationship by pins 260, 261 which permit controlled relative translation of each part, while preventing relative rotation. Movement of drive element 130 into shell 220 acts to translate both wheel gripper 210 and extender element 230, until wheel gripper 210 engages the inner rim of a steering wheel and thereupon completes the mounting of the device.

The functioning and detailed structure of control member 100 will be understood from consideration of FIGS. 3, 4–7, and 11. This member is comprised of four basic elements: wheel gripper 110, shell 120, driver element 130, and locking arrangement 140.

Wheel gripper 110 may advantageously be similar in configuration to its counterpart 210 on actuated member 200. Gripper 110 is integrally affixed to the end of shell 120, while gripper 210 is adapted for mobile mounting on shell 220. Similar components of grippers 110 and 210 have been given similar numerical indicia.

Figure 11:
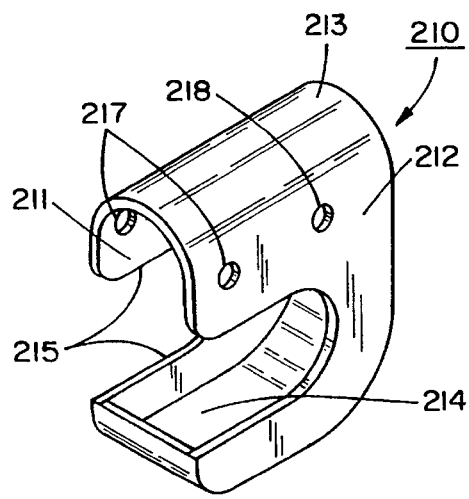
FIG. 11 is a perspective view of the wheel grip element used in an illustrative embodiment of the invention.

As illustrated in perspective in FIG. 11, the grippers comprise two side walls 211, 212 interconnected at the top by a saddle portion 213 and at the bottom by a bridging portion 214. Saddle portion 213 is configured to match the outer surface of shell 220. Bridging portion 214 terminates to create an aperture 216 facing along shell 220, when mounted thereon. Aperture 215 serves as a pocket to grip a steering wheel and aperture 216, facing the extended portion of the related shell 220, serves as a nesting place for shell 120 during storage.

Figure 5A:
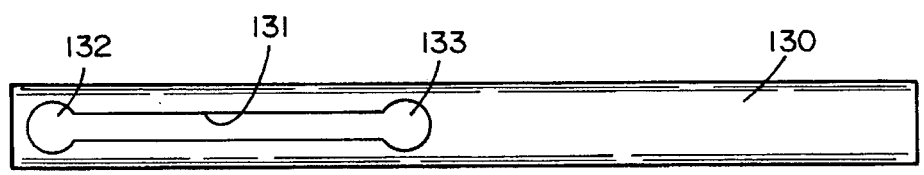
FIG. 5A is a side view of the telescoping drive element mounted within the control member.
Figure 5B:
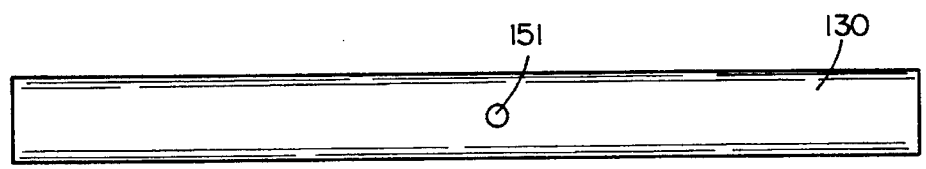
FIG. 5B is a top view thereof.
Figure 9A:
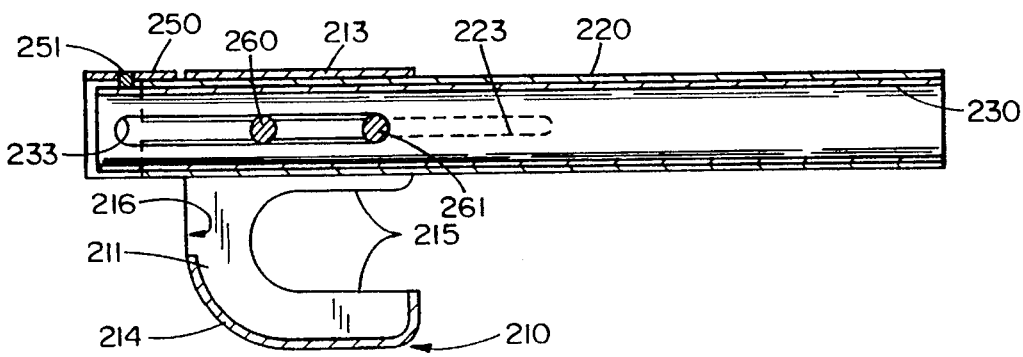
FIGS. 9A and 9B are cross-sections of the actuated member taken along the line 9—9 in FIG. 8B, showing the telescoping extension element contracted and extended, respectively.
Figure 9B:
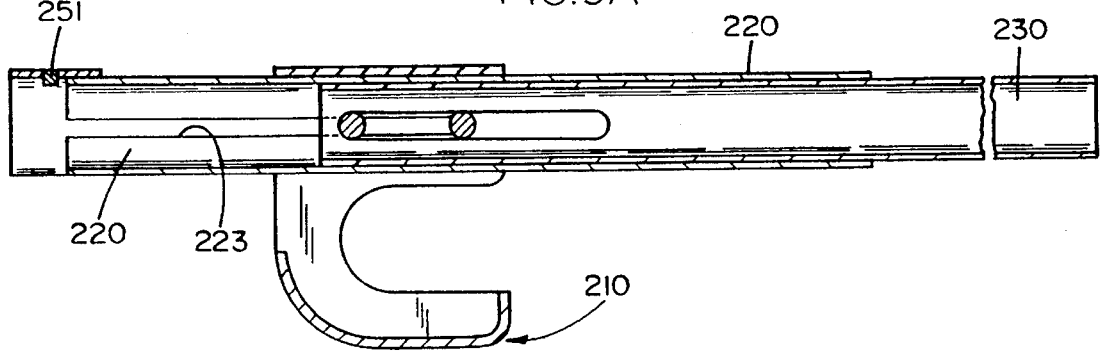
Figure 10:
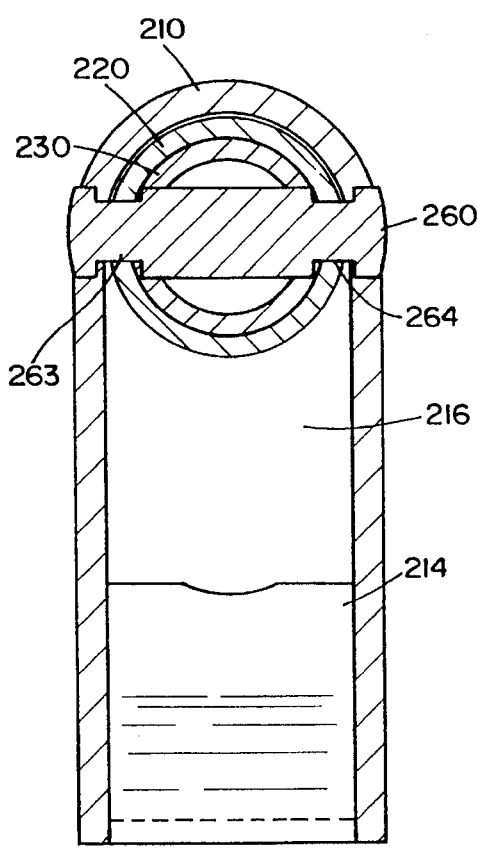
FIG. 10 is a cross-section of the wheel grip element on the actuated member taken along the line 10—10 in FIG. 8B.

Driver 130 is an elongated cylindrical element having a diameter slightly less than the inside diameter of shell 120. It is adapted for telescopic insertion into shell 120 and is held in position by locking arrangement 140. FIG. 5 shows that along one side of this element, there is a slot 131 that terminates at each end in a hole 132,133 of diameter greater than the width of the slot.

Figure 7:
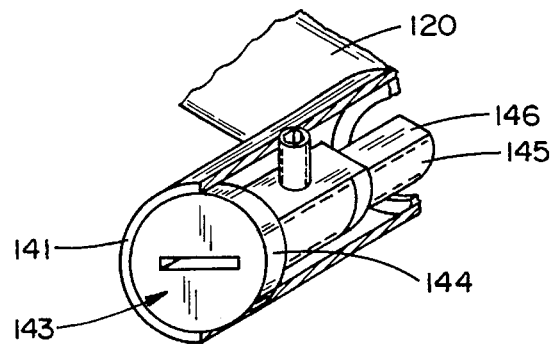
FIG. 7 is an enlarged perspective view of the locking mechanism on the control member.
Figure 8A:
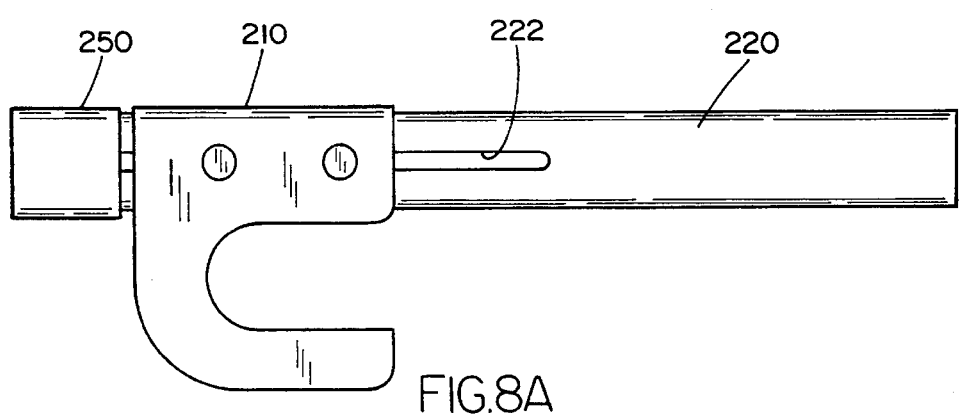
FIGS. 8A and 8B are side and top views, respectively, of the actuated member of an illustrative embodiment of the invention.
Figure 8B:
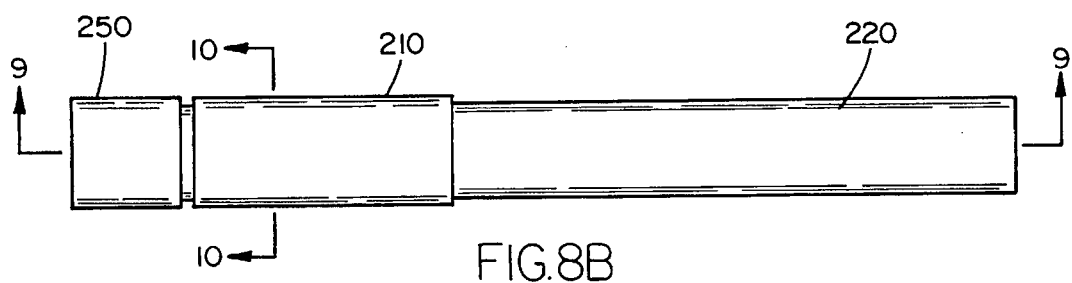
Figure 4A:
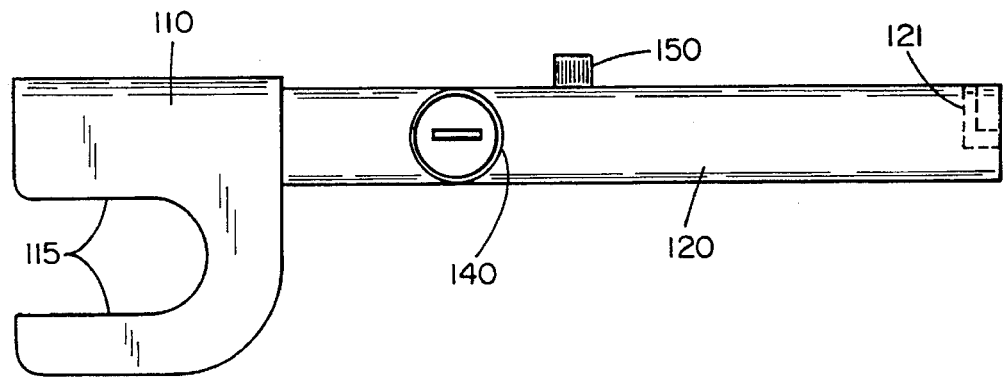
FIG. 4A is a side view of the control member of an illustrative embodiment of the invention.
Figure 4B:
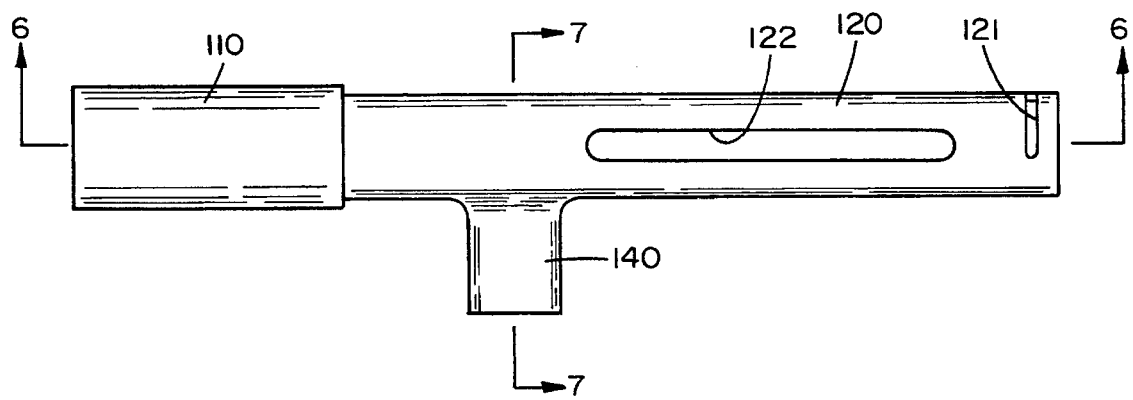
FIG. 4B is a top view of this member.

As seen in FIG. 7, locking arrangement 140 is located within a housing 141 orthogonally mounted to shell 120. Housing 141 and the adjacent wall of shell 120 are pierced by a cylindrical aperture within which is mounted a cylinder lock 143. Cylinder lock 143 includes a stationary mounting portion 144 interconnected by conventional coded key means with a rotatable armature 145. Armature 145 is of fixed diameter, with parallel lands 146 which reduce its width on diametrically disposed faces. The diameter of the armature 145 is slightly less than the diameter of the holes 132,133 that terminate slot 131. The distance between lands 146, is slightly less than the width of slot 131. Lock 143 has only two positions, the one shown in FIG. 7, and a second position in which the armature 145 is rotated 90 degrees.

Control member 100 is assembled by inserting driver element 130 within shell 120 and screwing the lock 143 into boss 141 so that armature 145 intersects the path of element 130 and enters slot 131. As thus mounted, when armature 145 is in the first position (i.e. as shown in FIG. 7), the lands are parallel to the walls of the slot 131 and element 130 is free to slide coaxially within shell 120. Only at the extremes of the slot 131, at holes 132,133, is it possible to turn armature 145 to its other position. In this second position, element 130 is held immovable relative to shell 120. The two immovable locations of element 130, correspond to the retracted and extended states of the anti-theft device.

Actuator handle 150, passes through longitudinal slot 122 in shell 120 and is threaded through driver element 130 to seat against the opposing wall thereof. A shoulder or other means is provided for sliding translation within slot 122. Thus, when enabled by proper key controlled rotation of armature 145 of locking arrangement 140, handle 150 is operable to translate driver element 130 outwardly from shell 120 until handle 150 strikes the end of slot 122.

The functioning and detailed structure of actuated member 200 will be understood from a consideration of FIGS. 3, and 8–11. This member is comprised of three basic elements: movable wheel gripper 210, cylindrical shell 220, and extender element 230. Prior to assembly of these elements, coupler 250 is also an independent element.

Note first that shell 220 has diametrically opposing slots 222,223 extending from one end to about the center of the element. Extender 230 has diametrically opposing slots 232,233 which are closed at each end and extend from near one end thereof for a distance approximately one third of the length of the element. The width of slots 232,233 is greater than the width of slots 222,223. Gripper 210 has a pair of holes 217,218 through both faces and aligned to match the location of the aforementioned slots, when saddled across the shell 220. The diameter of these holes is preferably equal to the width of slots 232,233.

As illustrated in FIG. 3, pins 260,261 are similar to one another. Each has a length equal to the outside width of gripper 210 and a general diameter slightly less than the diameter of holes 217,218. Each pin includes a pair of necked down areas 263,264 and 265,266 of diameter slightly less than the width of slots 222,223 in shell 220. The necked down areas are centered on the pins, at a distance corresponding to the mean diameter of shell 220 and are of sufficient extent to permit shell 220 to slidingly engage the pins for translation in slots 222,223.

To assemble member 200, wheel gripper 210 is attached to extender 230 by inserting pins 260,261 through the holes 217,218 of the gripper and passing them through the slots 232,233 on opposing surfaces of extender 230; extender 230 is then slid into shell 220, engaging the necked down areas 263–266 of the pins within the slots 222,223 arranged on opposing surfaces of shell 220. Pins 260,261 are thus prevented from movement transverse the axis of the assembly and they act as slide bearings for the relative axial movement of extender 230, shell 220, and gripper 210.

When wheel gripper 210, shell 220, and extender 230 are assembled, coupler 250 is affixed permanently at the end of shell 220. This blocks the open end of slots 222,223 and prevents disengagement of either gripper 210 or extender 230. Coupler 250, includes an inwardly projecting pin 251 adapted to engage entrapment slot 121 in the end of shell 120 of control member 100. The length of coupler 250 bridges the coaxially arranged members 100, 200 and assures a rigid tamper-free connection.

To use the device of this embodiment, the coupler end of actuated member 200 is aligned with the slot 121 of control member 100. In well-understood fashion, the members are brought together in axial alignment and rotated until the grippers 110,210 are in the same plane. The assembled device is then positioned over a steering wheel and lock mechanism 140 is opened to orient the lands 146 within slot 131. Actuator handle 150 is moved within slot 122 toward the coupler 250, moving driver element 130 into shell 220 and pushing against extender 230. Extender 230 then moves, forcing the closed end of slots 232,233 against pin 260. This causes wheel gripper 210 to translate along the shell 220, until the leading pin 261 blocks further motion by striking the forward end of slots 222,223. Locking mechanism 140 is then engaged to rotate the armature 145 and prevent further movement between the components.

The procedure used to disassemble and store the device of this invention, is a reverse of the steps used to assemble it on a steering wheel. A key is used to rotate armature 145 until the lands 146 are aligned with the walls of slot 131. Handle 150 may then be moved to the left (as shown in the FIG. 3). This releases extender 230 and it permits it to be contracted into shell 220, bringing with it gripper 210. Gripper 210 thereby releases the steering wheel and the device may be removed. Alternatively, after rotation of the lock cylinder, extender 230 may simply be pushed back into shell 220.

Members 100,200 are separated by relative clockwise rotation of shells 120,220. This moves pin 251 within slot 121, until shell 220 can be axially removed. Members 100 and 200 are then brought together as shown in FIG. 2, with shells 120,220 along parallel adjacent axes and the shells nested within apertures 116,216. In this "packaged" form, the device may be conveniently handled and/or stored in an automobile glove box.

It is to be understood that typical basic elements of an illustrative embodiment only, have been described. In a working commercial model of the invention, it is expected that the elements will be case hardened and integrally welded or otherwise affixed. Furthermore the entire surface of the shells and all exterior elements may advantageously be coated with a hard rubber material to cover all joints and crevices and yield the desired perception of an impenetrable and tamperproof unit.

While a particular embodiment of the invention has been shown and described, modifications of this embodiment will be apparent to those skilled in the art. It is intended that such modifications are included within the definition of the following claims.

What is claimed is:

1. An anti-theft device for attachment to the steering wheel of an automobile, comprising in combination first and second members only, each having wheel gripping means forming a part thereof, the wheel gripping means on one of said members being mounted for limited translation along said one member, means for assembling said first and second members in coaxial alignment, core means adapted for translation within and between said members when coaxially assembled, and means responsive to said translation to increase the separation between said wheel gripping means and said means responsive to said translation adapted for telescopic translational movement to increase the length of the aligned assembly to more than the combined length of said first and second members.

2. An anti-theft device for attachment to the steering wheel of an automobile as defined in claim 1, wherein said first and second members include elongated housings, and wherein the translation of said core means exposes a portion thereof outside of said housings and beyond the wheel gripping means at the remote end of one of said coaxially assembled members, the length of the aligned assembly being greater than the combined length of said first and said members by an amount equivalent to the exposed portion of said core means.

3. An anti-theft device for attachment to the steering wheel of an automobile as defined in claim 1, wherein said core means comprises individual core elements within each of said members, the core element within one of said members being coupled to the gripping means thereof and being translatable along the axis of said members.

4. An anti-theft device for attachment to the steering wheel of an automobile as defined in claim 1, wherein said core means comprises individual core elements adapted for translation within each of said members, said core elements bearing against one another when said members are assembled in alignment; said first member includes locking means to control translation of the core element therein and includes actuating means for effecting said translation; the core element of said second member being acted upon by said translation to extend beyond an end of said second member.

5. An anti-theft device for attachment to the steering wheel of an automobile as defined in claim 1, wherein said core means comprises individual core elements within each of said members, the core element of the second member being coupled to the gripping means thereof and being translatable along its axis, the means coupling said core element to said gripping means being effective to limit the extent of translation of said gripping means by a first predetermined amount, and to limit the extent of translation of said core element by a second predetermined amount, whereby said gripping means secures the device to said steering wheel and said core element extends beyond the periphery of said steering wheel.

6. An anti-theft device for attachment to the steering wheel of an automobile as defined in claim 1, wherein said first and second members comprise elongated housings: and said means for assembling said members comprise a collar rigidly affixed and projecting from a proximate end of the second member, and coupling means on said first member for engaging said collar with a proximate end thereof.

7. An anti-theft device for attachment to the steering wheel of an automobile, comprising first and second members with elongated housings, each having wheel gripping means forming a part thereof projecting orthogonally therefrom, means for assembling said first and second members in coaxial alignment, and core means in said first and second members adapted for telescopic translation to increase the length of the aligned assembly, said wheel gripping means having apertures adjacent to their respective housing, whereby when disassembled said members can be placed adjacent to one another along parallel axes and through the gripping means of one another.

8. An anti-theft device for attachment to the steering wheel of an automobile as defined in claim 7, wherein the translation of said core means exposes a portion thereof outside of the housings, the length of the coaxially assembled device being greater than the combined length of said elongated housings by an amount equivalent to the exposed portion of said core means.

9. An anti-theft device for attachment to the steering wheel of an automobile as defined in claim 7, wherein said first member includes locking means to control translation of the core means therein.

10. An anti-theft device for attachment to the steering wheel of an automobile as defined in claim 9, wherein said core means comprises individual core elements within each of said members, the core element within one of said members being coupled to the gripping means thereof and being translatable along the axis of said members.

11. An anti-theft device for attachment to the steering wheel of an automobile as defined in claim 10, including means for translating the core element of said first member into said second member and thereby translate the core element of said second member beyond an end thereof.

12. An anti-theft device for attachment to the steering wheel of an automobile as defined in claim 7, wherein said members and said core means are cylindrical.

13. An anti-theft device for attachment to the steering wheel of an automobile as defined in claim 7, wherein said core means comprises individual core elements adapted for translation within each of said members, said core elements bearing against one another when said members are assembled in alignment; said first member includes locking means to control translation of the core element therein and includes actuating means for effecting said translation; the core element of said second member being acted upon by said translation to extend beyond an end of said second member.

14. An anti-theft device for attachment to the steering wheel of an automobile as defined in claim 13, wherein the core element of said second member is coupled to the gripping means thereof.

15. An anti-theft device for attachment to the steering wheel of an automobile as defined in claim 7, wherein said core means comprises individual core elements within each of said members, the core element of the second member being coupled to the gripping means thereof and being translatable along its axis, the means coupling said core element to said gripping means being effective to limit the extent of translation of said gripping means by a first predetermined amount, and to limit the extent of translation of said core element by a second predetermined amount, whereby said gripping means secures the device to said steering wheel and said core element extends beyond the periphery of said steering wheel to limit the rotation thereof.

16. An anti-theft device for attachment to the steering wheel of an automobile as defined in claim 15, wherein said core elements bear against one another when said members are assembled in alignment; said first member includes locking means to control translation of the core element therein and actuating means for effecting said translation; the core element of said second member being acted upon by said translation to extend beyond an end of said second member.

17. An anti-theft device for attachment to the steering wheel of an automobile as defined in claim 7, wherein said means for assembling said members comprise a collar rigidly affixed and projecting from a proximate end of the second member, and coupling means on said first member for engaging said collar with a proximate end thereof.

18. An anti-theft device for attachment to the steering wheel of an automobile as defined in claim 17, wherein said members each comprise individual telescoping core elements adapted for translation therein, said core elements bearing against one another when said members are assembled in alignment; said first member includes locking means to control translation of the core element therein and actuating means for effecting said translation; the core element of said second member being acted upon by said translation to extend beyond an end of said second member.

19. An anti-theft device for attachment to the steering wheel of an automobile as defined in claim 18, wherein said members and said core elements are cylindrical.

20. An anti-theft device for attachment to the steering wheel of an automobile as defined in claim 19, wherein the core element of said second member is coupled to the gripping means thereof.

* * * * *